(12) United States Patent
Wark (10) Patent No.: US 8,122,911 B2
(45) Date of Patent: Feb. 28, 2012

(54) ADJUSTABLE ORIFICE FOR COAL SUPPLY CONDUIT

(76) Inventor: Rickey E. Wark, Spring, TX (US)

( * ) Notice: Subject to any disclaimer, the term of this patent is extended or adjusted under 35 U.S.C. 154(b) by 70 days.

(21) Appl. No.: 12/774,336

(22) Filed: May 5, 2010

(65) Prior Publication Data

US 2011/0271771 A1    Nov. 10, 2011

(51) Int. Cl.
*F15D 1/04* (2006.01)
*F15K 15/03* (2006.01)
(52) U.S. Cl. ......... 138/45; 138/46; 138/104; 137/512.1; 137/527; 251/212
(58) Field of Classification Search ............ 138/46; 251/212, 250.5; 137/512, 512.5
See application file for complete search history.

(56) References Cited

U.S. PATENT DOCUMENTS

1,743,731 A * 1/1930 Scott ................ 126/285 R
(Continued)

*Primary Examiner* — Patrick F Brinson
(74) *Attorney, Agent, or Firm* — Young Basile Hanlon & MacFarlane PC (57) ABSTRACT

A variable orifice for use in connection with a conduit designed to convey particulate material comprising a set of semi-circular plates mounted on respective concentric shafts so that they may be rotated in opposite directions between a first position in which they extend across the interior of the conduit for maximum flow resistance to a second folded condition where they are adjacent and parallel to one another to present minimum flow resistance. An actuator is connected through the concentric shafts to the plates and mounts on the outside of the conduit surface. The unit is operated by hand crank and has a position indicator. The size of the valve plates is such that, even when fully extended relative to one another and lying across the cross-section of the conduit, only about a 30% restriction is produced.

6 Claims, 7 Drawing Sheets

U.S. PATENT DOCUMENTS

| | | | |
|---|---|---|---|
| 2,390,150 A * | 12/1945 | O'Hare et al. | 138/46 |
| 3,072,141 A * | 1/1963 | Wheeler, Jr. | 137/512.1 |
| 3,384,112 A * | 5/1968 | Smith | 137/512.1 |
| 3,533,438 A * | 10/1970 | Smith | 137/512.1 |
| 3,559,679 A * | 2/1971 | Smirra | 137/554 |
| 3,678,958 A * | 7/1972 | Satterwhite et al. | 137/512.1 |
| 4,043,358 A * | 8/1977 | Sliski | 137/512.1 |
| 4,079,751 A * | 3/1978 | Partridge et al. | 137/516.29 |
| 4,196,745 A * | 4/1980 | Schutzer | 137/512.1 |
| 4,269,166 A * | 5/1981 | Worley et al. | 126/285 R |
| 4,321,944 A * | 3/1982 | Schutzer | 137/512.1 |
| 5,301,709 A * | 4/1994 | Gasaway | 137/15.18 |
| 5,819,791 A * | 10/1998 | Chronister et al. | 137/512.1 |
| 5,873,156 A | 2/1999 | Wark | 209/722 |
| 6,012,483 A * | 1/2000 | Beddies | 137/512.1 |
| 6,055,914 A | 5/2000 | Wark | 110/104 R |
| 6,186,079 B1 | 2/2001 | Wark | 110/104 R |
| 6,234,090 B1 | 5/2001 | Wark et al. | 29/401.1 |
| 6,257,415 B1 | 7/2001 | Wark | 111/104 R |

* cited by examiner

ADJUSTABLE ORIFICE FOR COAL SUPPLY CONDUIT

FIELD OF THE INVENTION

This invention relates to variable orifices for use in combination with conduits designed to convey particulate material such as pulverized coal or metal ore.

BACKGROUND OF THE INVENTION

It is common to use metal pipe as a conduit for the conveyance of particulate matter from one point to another. An example is the transportation of finely crushed coal from a pulverizer to a combustion chamber or "firebox" where the pulverized coal is ignited and the heat used to make steam which powers a turbine. Metal conduits are also used to transport mineral ore and many other materials in extraction and refining operations.

In some conduit arrangements, it is essential to be able to regulate the flow of material through the conduit; for example, it is often desirable to balance the flow of pulverized coal flowing through multiple, parallel conduits to supply points around a combustion chamber thereby to control the shape and location of the fireball within a the combustion chamber.

Various types of valves or variable orifices have been designed for this purpose. Some such devices are gate type valves in which a blade structure is set up to slide variably across the interior cross-section of the conduit. There are numerous disadvantages associated with gate valves of this type. Other orifices use variable angle blades.

SUMMARY OF THE INVENTION

A first aspect of the present invention is an improved variable orifice of the variable angle type for use in combination with conduits designed to convey particulate material, such as pulverized coal or metal ore from one point to another. In accordance with the first aspect of the invention, a fabricated variable orifice comprises first and second plates, preferably of semi-circular shape, mounted in a contiguous fashion for coordinated angular movement between a first position in which the plates are adjacent along their diametric edge and are substantially co-planar, to a second position to which the plates are in a folded, substantially adjacent and parallel condition. In the preferred device, the dimensions are such that, when mounted within the conduit for which they are intended, a clearance exists entirely around the outer edges of the plates and inner surfaces of the conduit when the plates are co-planar; i.e., fully extended to the maximum restriction position.

In a preferred embodiment hereinafter described in detail, the invention further comprises an actuator connected to a pair of concentric shafts, each shaft in the concentric arrangement being attached to a respective plate, such that rotation of the two shafts in opposite directions moves the plates in the fashion of butterfly wings between the folded and extended positions described above. The actuator permits multiple intermediate positions of the blades between the maximum and minimum restriction positions.

Also in the preferred embodiment, a mechanism for rotating the shafts and including a position indicator is fabricated in such a way as to be attached to the outer surface of the conduit wall, with the shafts holding the blades extruding through the conduit wall.

In accordance with the second aspect of the invention, a method of installing a variable orifice of the type described above is provided. In general, the method comprises forming an elongate slot in the sidewall of the conduit for which the variable orifice is intended, folding the plates of the variable orifice to the adjacent parallel (minimum restriction) condition, inserting the plates through the slot, attaching a mounting plate to the outer surface of the conduit wall and thereafter operating the orifice in the intended manner.

A more complete understanding of the invention can be obtained by reading the following specification which describes an illustrative and preferred embodiment thereof.

BRIEF DESCRIPTION OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENT

Referring to the figures, the variable orifice 10 comprises first and second semi-circular metal valve plates 12, 14 mounted on a concentric shaft arrangement 16 which is connected to an actuator gearbox 18 in such a way that the relative positions of the two plates 12, 14 can be changed by rotation of a manual crank handle 20. An indication of the position of the valve plates 12, 14 within a conduit 24 as hereinafter described in greater detail is provided by the external dial 22 with a pointer 55.

Figure 4:
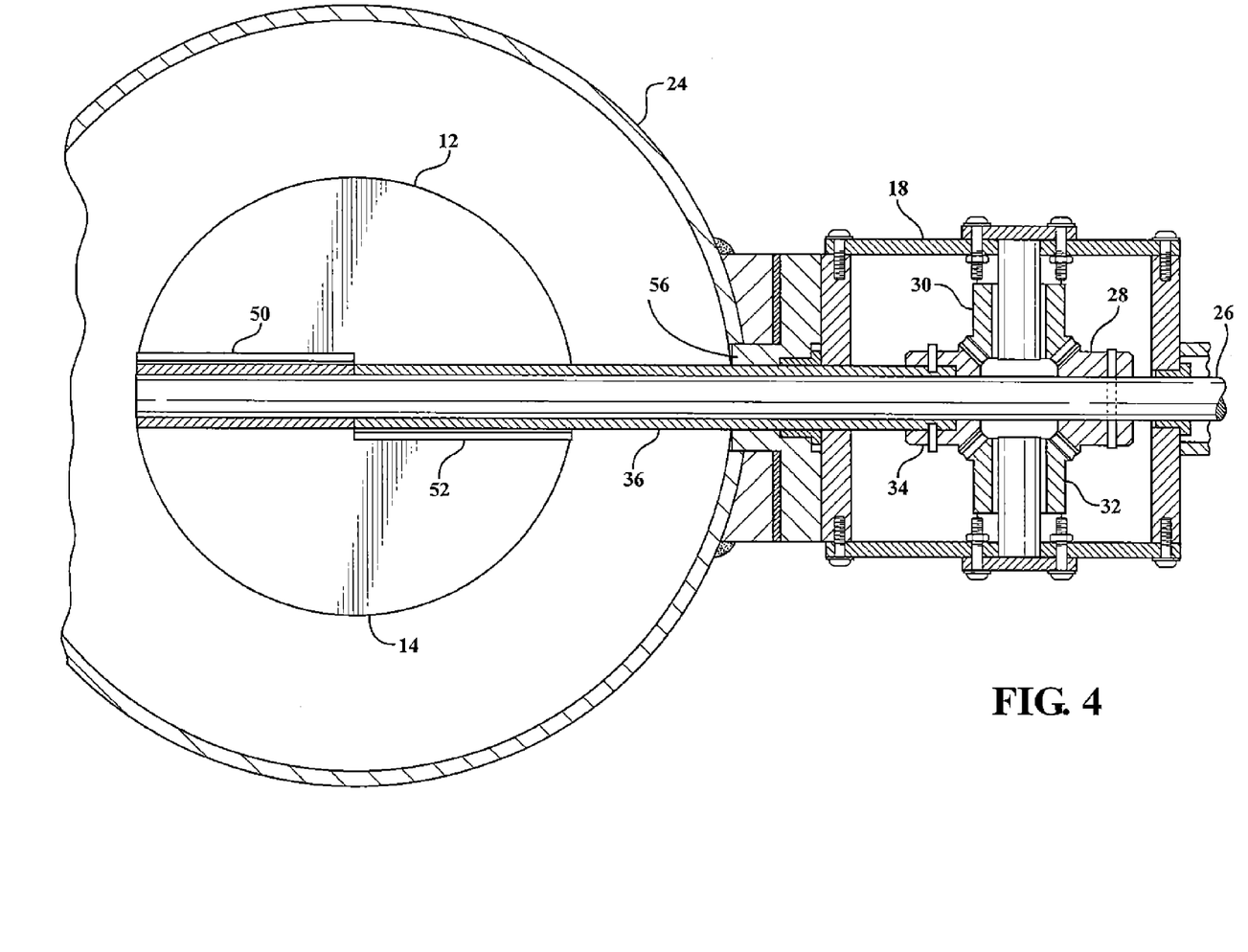
FIG. 4 is a cross-sectional view of the embodiment of FIG. 3 showing detail of the concentric shaft actuator.
Figure 5:
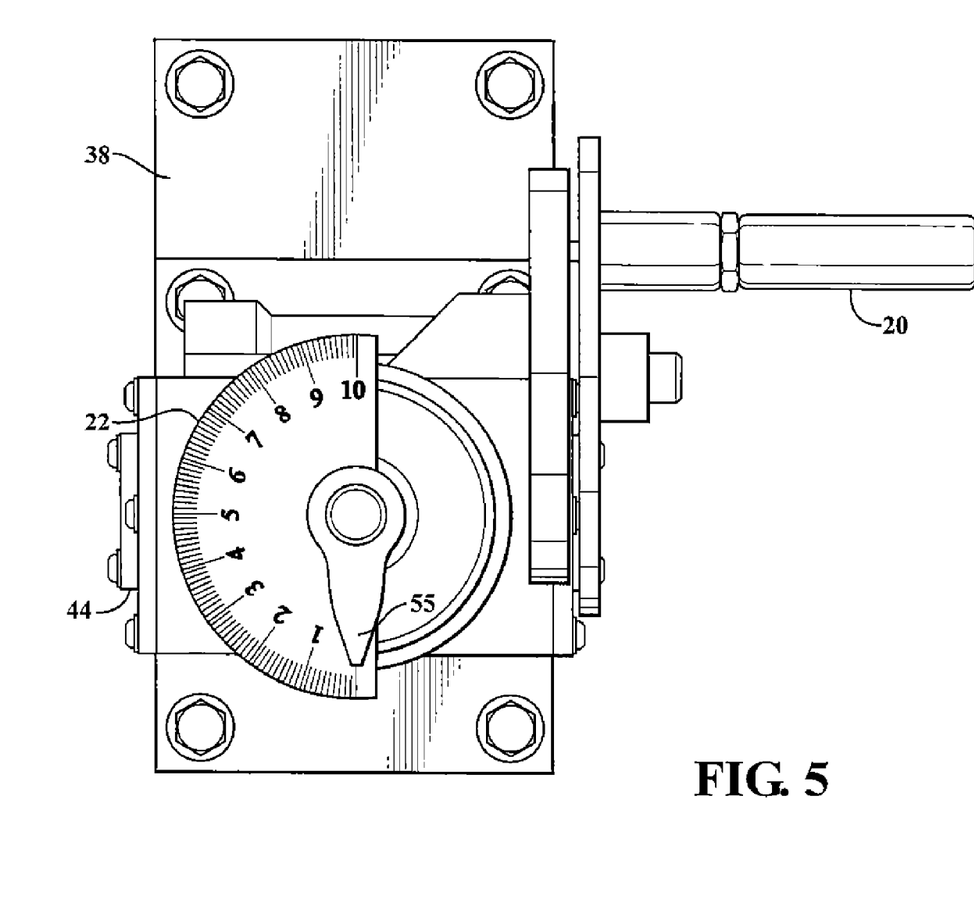
FIG. 5 is a plan view of a position indicator of the device of FIG. 1.

In this case, the conduit 24 is circular in cross-section and is made of cylindrical steel having internal and external surfaces. As best shown in FIG. 4, the concentric shaft arrangement comprises a central shaft 26 which extends through the gearbox 18 and is welded to one of the two plates 12, 14 along an edge thereof so that rotation of the shaft 26 also changes the angular position of the plate to which it is attached within the interior of the conduit 24. The shaft 26 is connected to a drive gear 28 which meshes with satellite gears 30, 32 to rotate a second drive gear 34 which is attached to an external shaft 36 concentric with the shaft 26. The shaft 36, thus, rotates in the opposite direction as shaft 26. Shaft 36 is welded along the edge of the other of the two plates 12, 14 so that the two plates 12, 14, when the shafts 26, 36 are rotated, rotate in angularly opposite directions.

The structure for mounting the variable orifice to the conduit 24 comprises plates 38, 42 and a gasket 40. The plates 38 and 42 are drilled and the holes in plate 42 are tapped to receive bolts 41 which extend through the gasket into the plate 42. A surface of plate 42 is contoured to fit flush against the circular exterior surface contour of the conduit 24 and is molded to the conduit sidewall.

Figure 1:
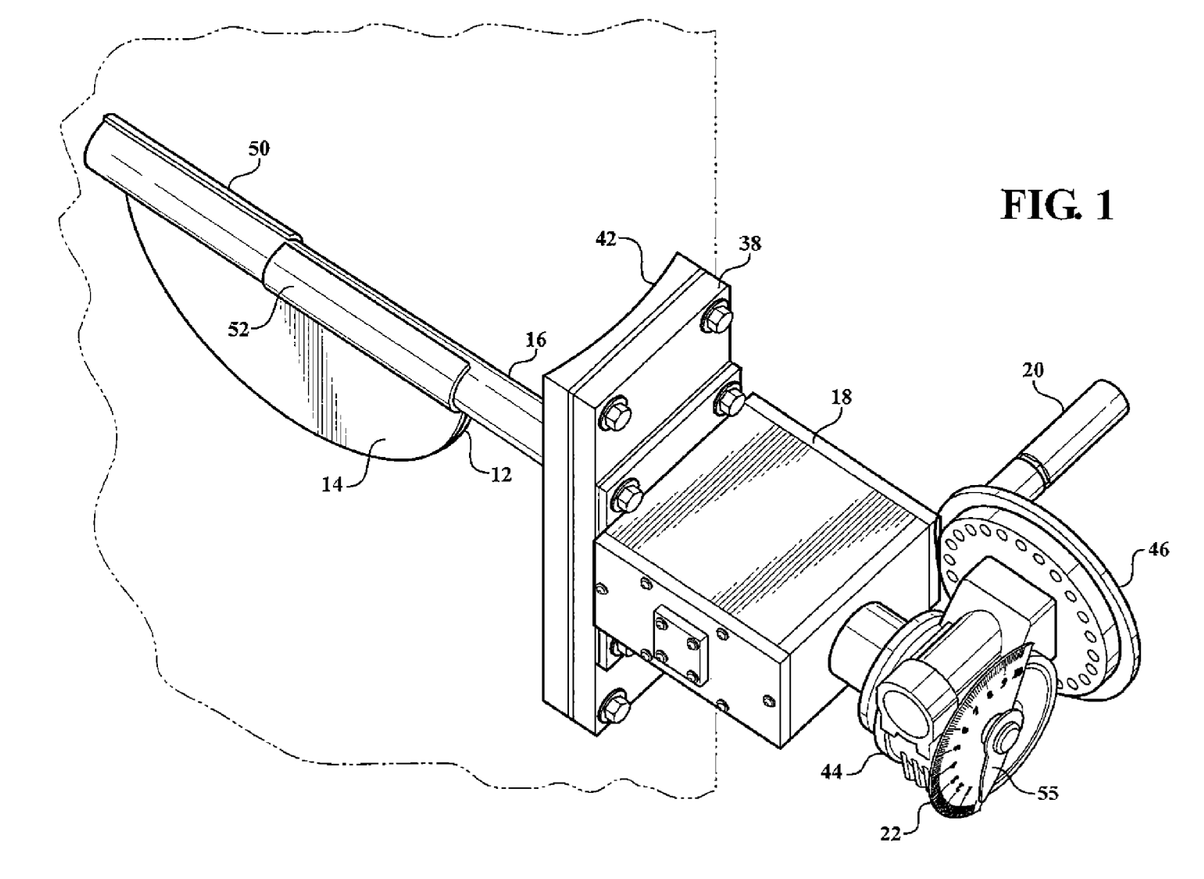
FIG. 1 is a perspective drawing of an illustrative embodiment of the invention adapted to be installed to and in a conduit in the form of a cylindrical pipe.
Figure 2:
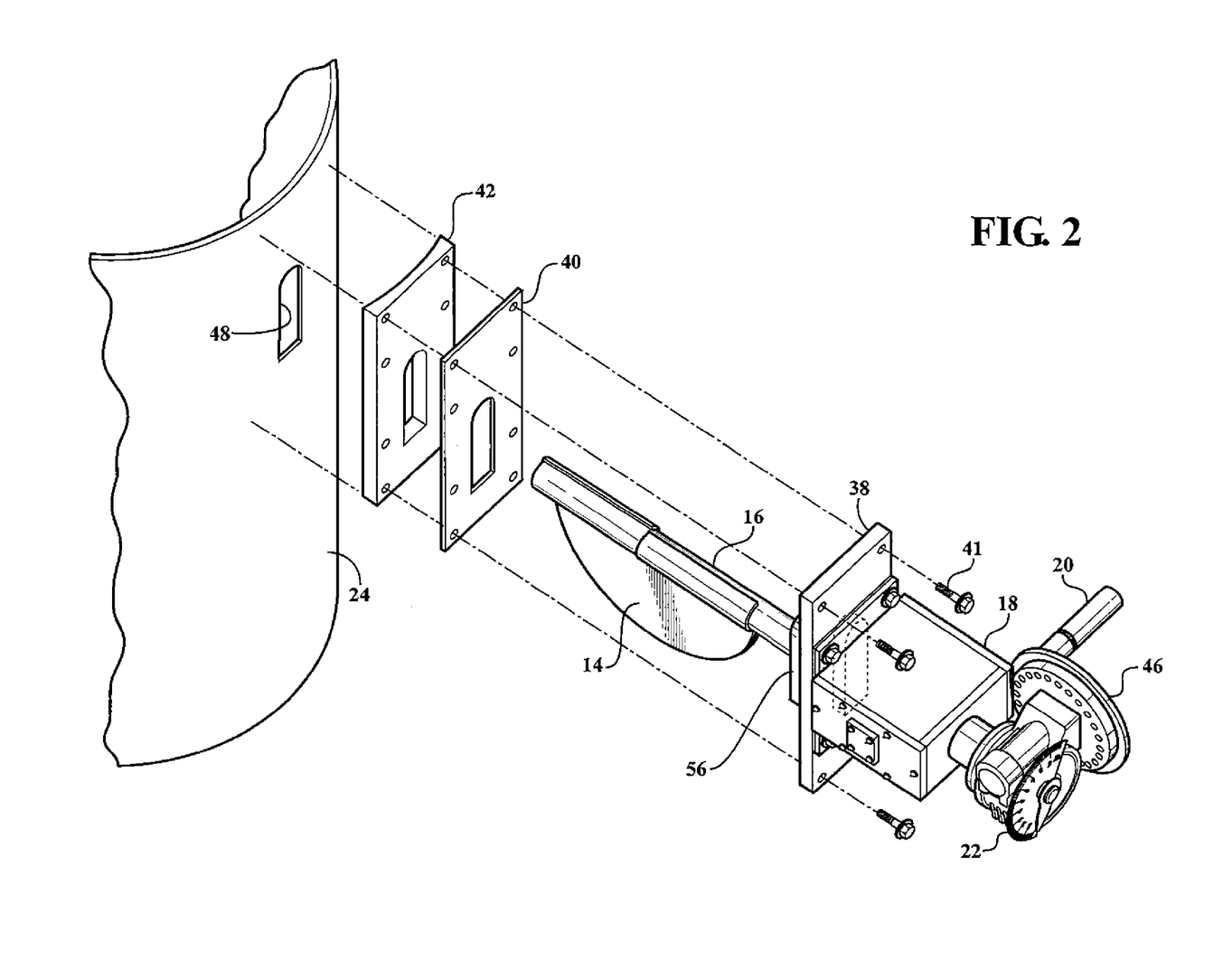
FIG. 2 is an exploded view of the embodiment of FIG. 1.
Figure 3:
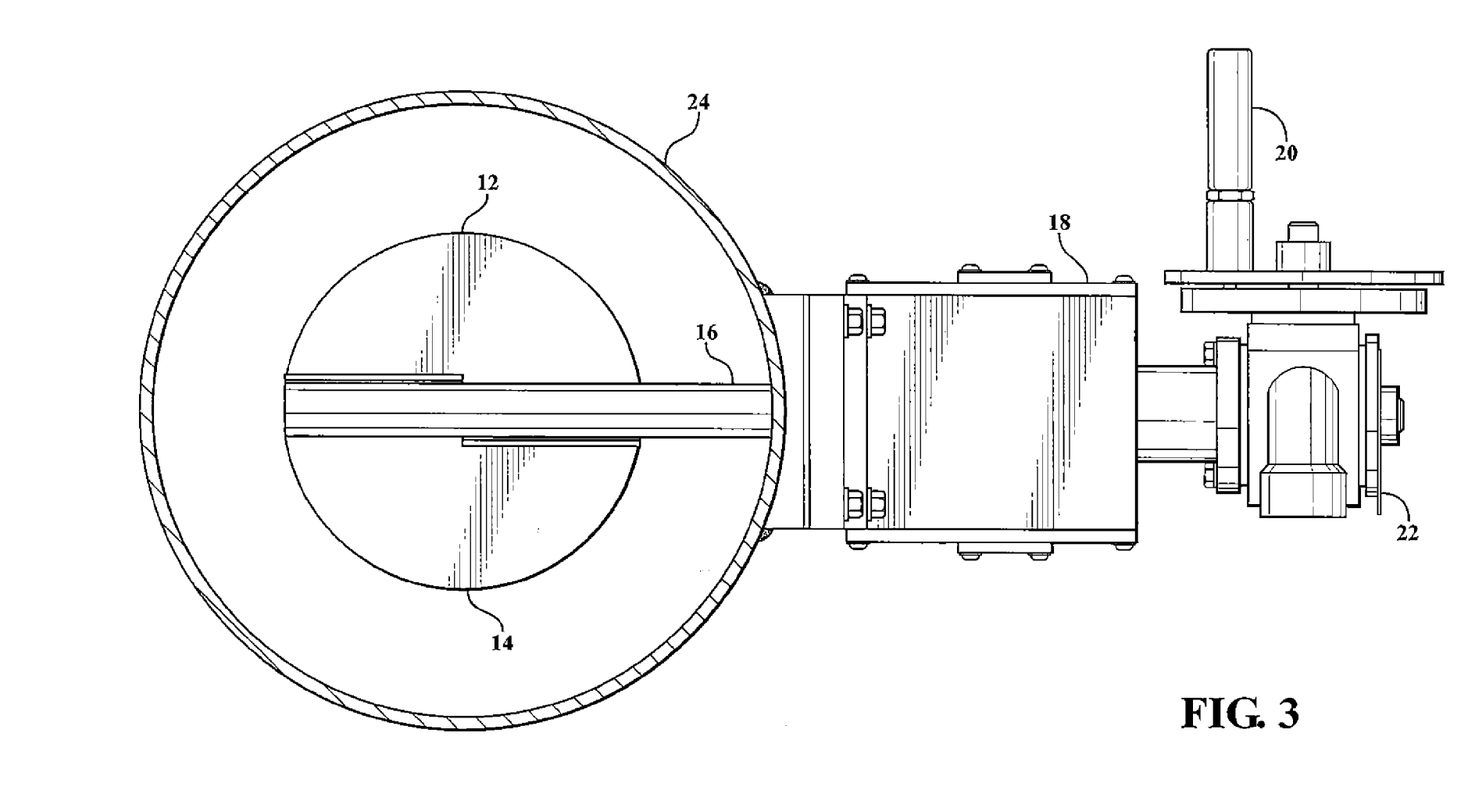
FIG. 3 is a plan view of the embodiment of FIG. 1 in the installed and maximum restriction condition.
Figure 6A:
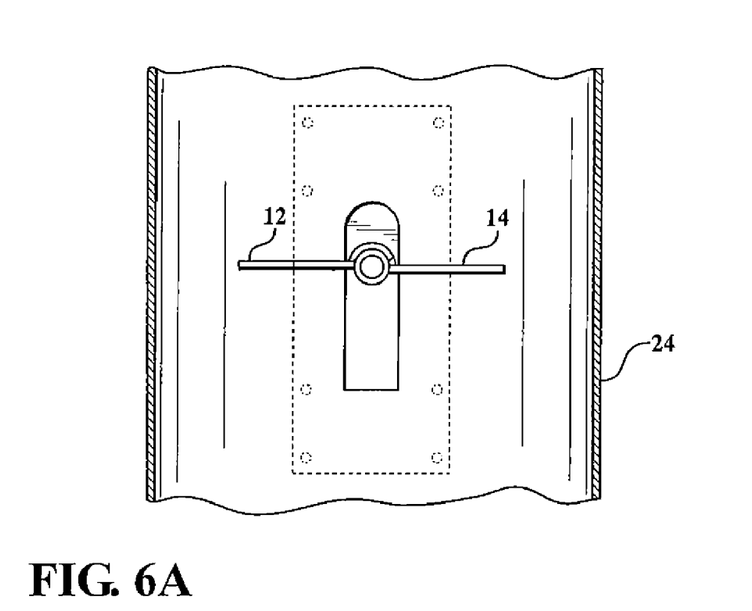
FIGS. 6A through 6C are sectional views through the conduit showing various positions of the variable orifice.
Figure 6B:
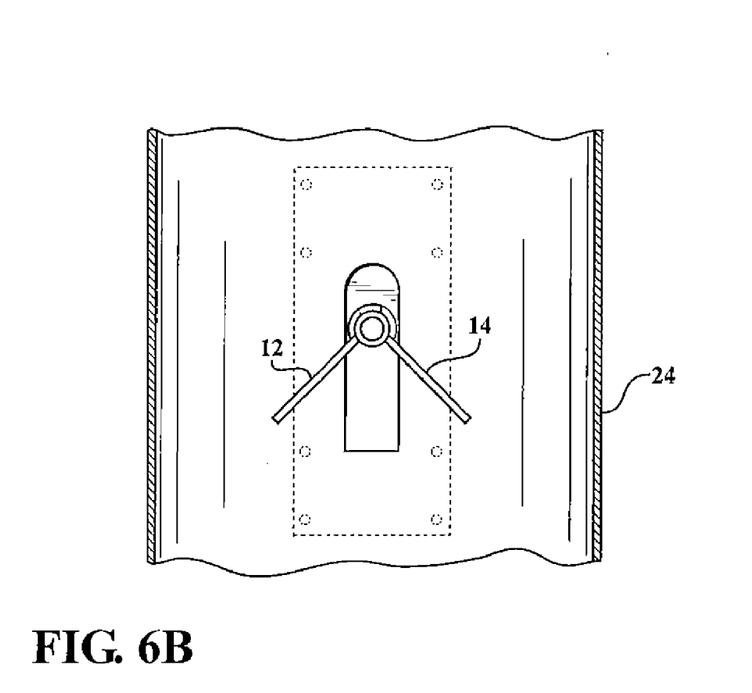
Figure 6C:
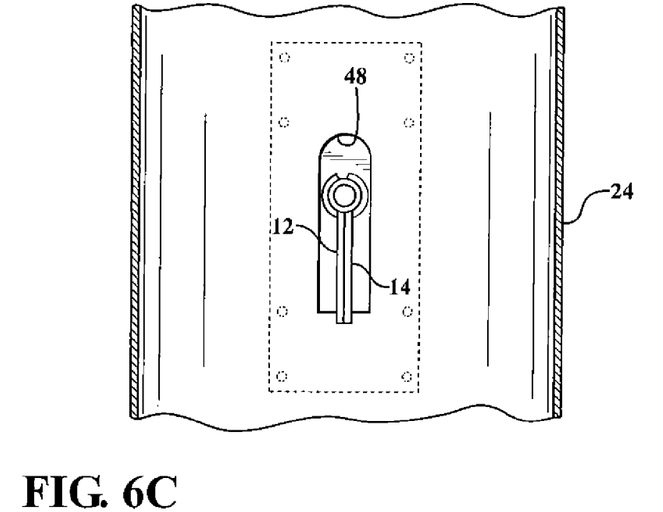
Figure 7:
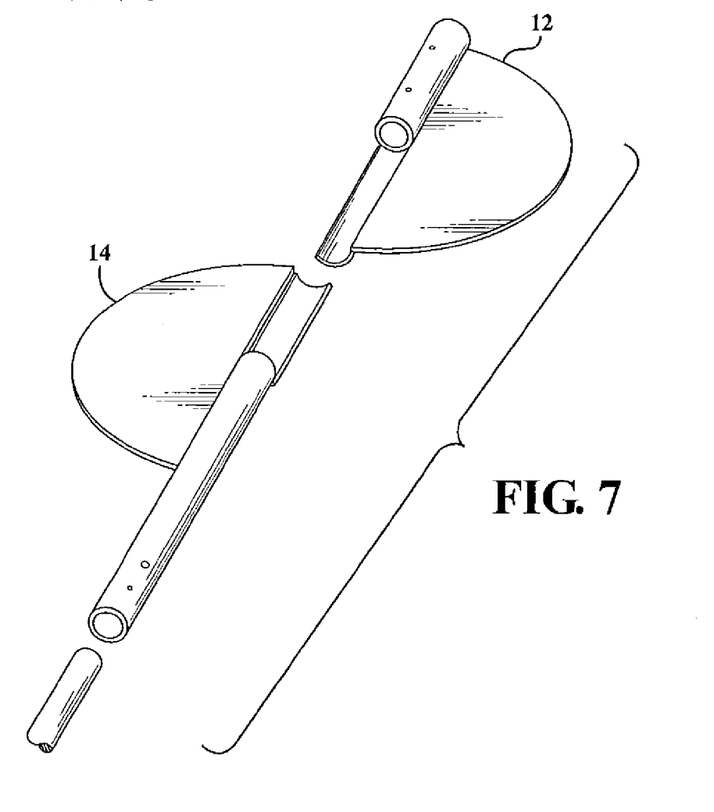
FIG. 7 is an exploded view of the two plates and their connector shafts.

For installation purposes, an elongate, key-shaped slot 48 is cut into the sidewall of the conduit 24, and plate 42 is welded in place, The plates 12, 14 are rotated to the fully folded position shown in FIG. 6C and are inserted through the plate 42 and the gasket 40, through the aperture or slot 48 and into the center of the conduit 24. It will be noted particularly with reference to FIGS. 3 and 4 that the overall diameter of the plates 12, 14 in the fully extended position is substantially less than the interior diameter of the conduit 24. Thus, the maximum restriction condition in this illustrative embodiment is approximately 30% of the overall cross-sectional area of the conduit 24. The crank 20 may be operated with the help of the indicator 22 to place the plates 12, 14 in an intermediate position shown in FIG. 6B or in the fully extended position shown in FIG. 6A or in the fully folded (minimum restriction) position shown by FIG. 6C. Multiple intermediate positions are preferably provided by a detent plate 46.

The crank 20 is connected through a shaft in the gearbox 44 with a worm gear connection to the shaft 26 so as to rotate the indicator pointer 55 relative to the indicator dial 22 so that the pointer always illustrates or represents the angular position of the plates 12, 14 and the degree of restriction created.

For abrasion resistance purposes, collars 50, 52 are welded to the shafts and plates to protect them from abrasion due to the flow of particulate matter through the conduit 24. It should be noted that the flow direction in the drawings of FIGS. 1, 6A, 6B and 6C is from bottom to top; i.e., into the included angle between the plates 12, 14 as shown in FIG. 6B.

It has also been found desirable to mount or form a plug 56 on the outside of the plate 38, which plug extends through slots 58, 60 and into the notch or slot 48 formed in the sidewall of the conduit 24 to plug the conduit and prevent both abrasion and leakage. The fit of plug 56 into slot 40 should be close, but with enough tolerance to allow for installation.

It will be understood that the invention has been described with reference to an illustrative but preferred embodiment and that a number of variations from the structure illustrated are possible. It will also be understood that the plates 12, 14 and all other elements which are exposed to the abrasive action of particulate flow are preferably made of a wear-resistant material such as high hardness alloys and/or are made of softer metals but protected with either heat-treating or welded on abrasion-resistant materials or both.

What is claimed is:

1. In combination:
   a continuous conduit having an outer surface and an inner surface and designed to convey a flow of airborne particulate material therethrough;
   a slot formed in said conduit at a location where the inner surface is uninterrupted by flanges, seams or the like; and
   a variable orifice mounted to said conduit for varying the rate of flow between a low, non-zero and a high rate, said orifice comprising a pair of contiguous valve plates, a gear box and a pair of concentric shafts extending from the gear box to said plates through said slot, said shafts being attached to the gear box for simultaneous rotation in opposite directions to move the plate between a first position in which the plates extend across the interior of the conduit and a second position in which the plates are in a substantially folded and mutually parallel adjacent condition,
   the dimensions of the plates being such as to provide clearance around said plates between the outer edges of said plates and the uninterrupted inner surface of said conduit when the plates are in the first position thereby to establish said low, non-zero flow rate.

2. The combination defined in claim 1 further comprising a crank attached to said gear box for operating same for rotating said plates.

3. The combination defined in claim 1 further comprising a mounting plate attached to said gear box and contoured to conform to said outer surface of said conduit over and around said slot.

4. The combination defined in claim 3 wherein the mounting plate comprises a plug which substantially conforms to the cross-section of said slot and fills said slot when the mounting plate is attached to the outer surface of said conduit.

5. The combination defined in claim 1 wherein the plates are semi-circular.

6. The combination of claim 1 further including indicator means indicating the position of the plates.

* * * * *